July 9, 1940.   S. E. OPPERMAN   2,207,636
TRACTION LUG
Filed July 2, 1938
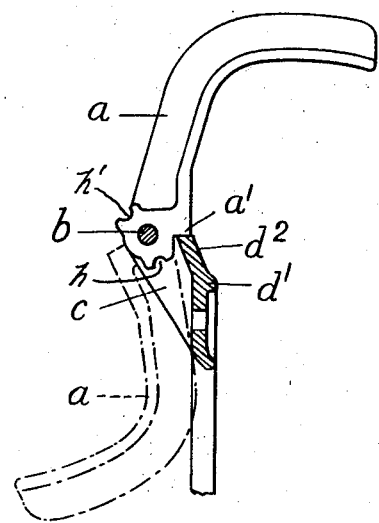
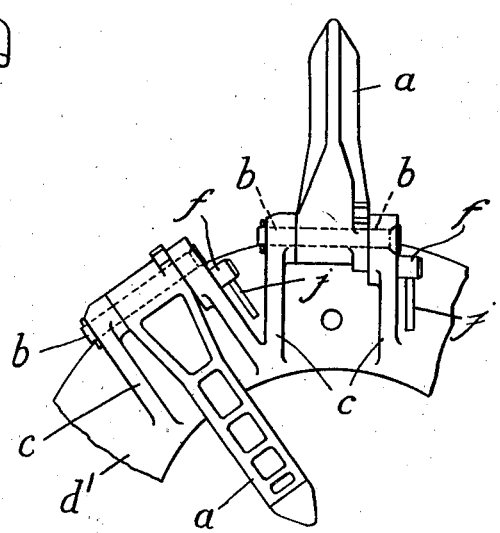
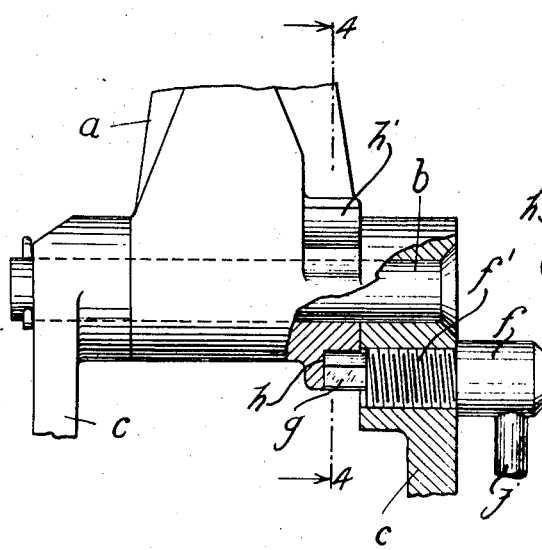
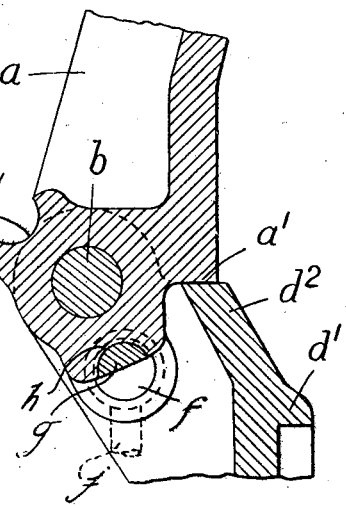
Inventor
Stanley Edward Opperman.
By H. B. Willson & Co
Attorneys Patented July 9, 1940

2,207,636

UNITED STATES PATENT OFFICE 2,207,636

TRACTION LUG

Stanley Edward Opperman, Barnet, England

Application July 2, 1938, Serial No. 217,276
In Great Britain July 2, 1937

3 Claims. (Cl. 301—50)

This invention for improvements in or relating to land grips or shoes for preventing slipping of agricultural and like tractor wheels is applicable chiefly to pneumatic tired driving wheels of tractors and has for its object to enable the shoes to be moved quickly into the operating position across the tread of the tire, or as easily moved into an inoperative position when not required as for example, when running on hard ground or on ordinary roads.

A further object is to enable the shoes when operative not only to prevent slipping, but also to relieve the tire of the load.

A further object of the present invention is to enable the shoes to be readily fitted to existing wheels and when fitted to enable them to be moved easily into and out of an operating position across the tread of the tire.

In order to facilitate the application of the shoes to existing wheels they are pivotally supported adjacent to the rim or a circular member of annular or disc-like form securable to the wheel and are adapted to be moved into an operative position, when the member is secured to the wheel.

Whether the circular member has an annular or a disc-like form, each shoe is suitably shaped or a disc-like form, each shoe is suitably shaped to engage the ground and to present a flat or slightly curved bedding surface to the tire for which purpose the parts which rest against the tread of the tire and also engage the ground, are formed of an inverted T shape in cross-section with triangular webs or gussets cast between the limbs. Each shoe is hinge jointed to ears or brackets protruding from the annular member in a direction generally at an angle to the vertical plane of the member so that when not in use the shoe may be swung back out of the way within the periphery of the member.

For the purpose of maintaining the shoe in its operative or inoperative positions a suitable catch or locking device is provided on one of each pair of ears or brackets as hereinafter described.

In the accompanying sheet of illustrative drawings:

Fig. 1 is a section taken through part of an annular mounting or ring for the shoes for attachment to existing wheels of farm tractors.

Fig. 2 is an outside elevation of part of the ring showing some shoes in their operative positions and others in their inoperative positions.

Fig. 3 is a sectional detail view drawn on a larger scale illustrating a shoe locking device, and Fig. 4 is a section taken at 4—4 of Fig. 3.

In the form of construction shown the shoes $a$ which are pivotally supported on pins $b$ between ears $c$ are carried by a ring $d^1$ adapted to be fixed to the side of a tractor wheel by a suitable number of bolts. In the operative positions of the shoes the load is taken in part by a shoulder $a^1$ on each shoe $a$ which bears against the slightly flared portion $d^2$ of the ring $d^1$, the tire being thus relieved of the load.

As clearly shown in Figs. 3 and 4 the locking catch in this case comprises a shouldered pin $f$ having a screw threaded portion $f^1$ screwing into a threaded aperture in the ear or bracket $c$ and an extension $g$ of D shape in cross section for engagement with either of two recesses $h$, $h^1$ formed in the pivoted end of the shoe $a$.

When the part $g$ is in engagement with either of the recesses $h$ or $h^1$ the shoulder on the pin $f$ is forced tight against the adjacent bracket $c$, the pin being turned by a small hand lever $j$ which can be struck with a mallet to tighten the pin $f$.

Turning of the screw or pin $f$ a half revolution from its final tight position will disengage the D-shaped extension $g$ from either of the recesses $h$ or $h'$ and a similar movement in the opposite direction effects the engagement as will be understood, permitting quick and easy releasing and locking of the shoes when in one position or the other.

I claim:

1. A traction attachment for a rubber-tired wheel comprising an inherently rigid support having means for rigidly attaching it to one side of a wheel, an angular shoe pivoted to said support to swing transversely of the wheel to and from operative position, the pivoted end of said shoe having two notches spaced apart about its pivot and opening away from said pivot, and a locking screw parallel with said pivot and threaded through a portion of said support, said screw having an off-center portion receivable in either of said notches to lock said shoe when said screw is tightened to a final tight position and movable from the notch to permit swinging of the shoe when said screw is loosened a half revolution from said final tight position, said notches and screw being so located as to cooperate in locking said shoe in either operative or inoperative position.

2. A traction attachment for a rubber-tired wheel comprising an inherently rigid support having means for rigidly attaching it to one side of a wheel, an angular shoe pivoted to said support to swing transversely of the wheel to and from operative position, the pivoted end of said shoe having two notches spaced apart about its pivot and opening away from said pivot, and a locking screw parallel with said pivot and threaded through a portion of said support, said screw having an off-center extension D-shaped in cross section on one end receivable in either of said notches to lock said shoe when said screw is tightened to a final tight position and movable from the notch to permit swinging of the shoe when said screw is loosened a half revolution from said final tight position, said notches and screw being so located as to cooperate in locking said shoe in either operative or inoperative position.

3. A traction attachment for a rubber tired wheel comprising an inherently rigid support having means for rigidly attaching it to one side of a wheel, the outer side of said support being provided with two lateral lugs, an angular shoe pivoted between said lugs to swing transversely of the wheel to and from operative position, the pivoted end of said shoe having two notches spaced apart around its pivot and opening away from said pivot, and a locking screw parallel with said pivot and threaded through one of said lateral lugs, said screw having an off-center extension projecting beyond the inner side of said one lug and receivable in either of said notches to lock said shoe when said screw is tightened to a final tight position and movable from the notch to permit swinging of the shoe when said screw is loosened a half revolution from said final tight position, said notches and screw being so located as to cooperate in locking said screw in either operative or inoperative position, said screw having a head to abut said one lug when the screw is turned to said final tight position.

STANLEY EDWARD OPPERMAN.